United States Patent [19]
Kim

[11] Patent Number: 5,510,899
[45] Date of Patent: Apr. 23, 1996

[54] METHOD OF MULTI-SPEED RECORDING-REPRODUCING A VIDEO SIGNAL IN DIGITAL VIDEO CASSETTE RECORDER

[75] Inventor: Dae J. Kim, Seoul, Rep. of Korea

[73] Assignee: Goldstar Co., Ltd., Seoul, Rep. of Korea

[21] Appl. No.: 175,712

[22] Filed: Dec. 30, 1993

[30] Foreign Application Priority Data

Apr. 2, 1993 [KR] Rep. of Korea .................. 93-5614

[51] Int. Cl.$^6$ .............................. H04N 5/76; H04N 5/782; G11B 5/00; G11B 5/09
[52] U.S. Cl. ........................... 358/335; 360/10.1; 360/32
[58] Field of Search ..................................... 358/335, 310, 358/342, 312; 360/8, 9.1, 10.1, 10.2, 10.3, 32; H04N 5/76, 5/78, 5/92, 5/783, 9/79, 5/781

[56] References Cited

FOREIGN PATENT DOCUMENTS

| | | | |
|---|---|---|---|
| 0454460 | 10/1991 | European Pat. Off. ......... | H04N 5/92 |
| 0461649 | 12/1991 | European Pat. Off. ......... | H04N 5/92 |
| 0505985 | 9/1992 | European Pat. Off. ......... | H04N 5/92 |

OTHER PUBLICATIONS

"Fast Scan Technology for MPEG Video Tape Recorders" by J. Boyce & F. Lane ISO/IEC JTC1/SC29/WG11 MPEG 93/251–Mar. 1993.
"A Study on FF/FR" Y. Noguchi–ISO/IEC JTCQ/SC29/WG11 MPEG 93/288 29 Mar. 1993.

*Primary Examiner*—Thai Q. Tran

[57] ABSTRACT

A method of reproducing a video signal in a digital video cassette recorder, comprising the step of performing intra-frame coding at an interval of a predetermined number of frames of the video signal to compress the video signal and recording the compressed video signal on a video tape, and the step of varying a travelling speed of the video tape according to a desired one of normal, still, fast forward, fast reverse, slow forward and slow reverse playback modes to reproduce the video signal recorded on the video tape in the desired playback mode. The travelling speed of the video tape is varied by combining speeds of the normal, still, fast forward jump and fast reverse jump modes according to the desired playback mode. The intra-frame coding is performed at an interval of L frames, where L is a natural number greater than or equal to 2, and first slice data of the coded Lth frame becomes first video data of a transmitted data field. Therefore, editing and speed change modes of the digital video cassette recorder can be performed in the basic unit of the coded Lth frame.

22 Claims, 14 Drawing Sheets

METHOD OF MULTI-SPEED RECORDING-REPRODUCING A VIDEO SIGNAL IN DIGITAL VIDEO CASSETTE RECORDER

FIELD OF THE INVENTION

The present invention relates in general to a digital video cassette recorder (referred to hereinafter as VCR), and more particularly to a method of reproducing a video signal in a digital VCR in which the video signal is compressed in a digital form and then recorded on a video tape, and the video signal so recorded is reproduced from the video tape.

BACKGROUND OF THE INVENTION

Referring to FIG. 1, there is shown a schematic view illustrating a general tape travelling system of a VCR. As shown in this drawing, a video tape is moved from a supply reel 6 to a take-up reel 7.

Namely, the video tape wound around the supply reel 6 is first moved through an inlet tape guide 2 and a supply loading post 8 to a rotatable head drum 1 to which recording and reproduction heads (not shown) are mounted. The recording and reproduction heads are adapted to record a video signal on the video tape and reproduce the video signal recorded thereon, respectively. While travelling along the head drum 1, the video tape is transferred to the take-up reel 7 through a take-up loading post 9, a capstan 5 and an outlet tape guide 4, the capstan 5 being in contact with a pinch roller 3.

Referring to FIG. 4, there is shown a schematic block diagram of a general high definition television (referred to hereinafter as HDTV) system. In a transmission part, a video signal from a camera is encoded by an encoder 12 for data compression thereof. The compressed data is transformed into a transmission format and then sent through a transmitter 13 to a transmitting antenna 14.

In a reception part, a video signal received through a receiving antenna 15 is detected by a receiver 16 and then decoded by a decoder 17 for data expansion thereof. The expanded video signal is displayed through a monitor 18. The video signal detected by the receiver 16 can also be recorded by a conventional digital VCR 19.

Referring to FIG. 5, there is shown a detailed block diagram of the conventional digital VCR 19. In a recording mode, the video signal from the receiver 16 in the HDTV system is received by an interface 21 and then interleaved by an interleaver 22 for error correction thereof. A recording formatter 23 is provided in the digital VCR 19 to transform the interleaved signal from the interleaver 22 into a desired recording format. A modulator 24 is adapted to modulate an output signal from the recording formatter 23. An output signal from the modulator 24 is amplified by a predetermined level by a recording amplifier 25 and then recorded on a video tape 26.

In a playback mode, a reproduction amplifier/equalizer circuit 31 amplifies the video signal recorded on the video tape 26 by a predetermined level and compensates for a distortion of the amplified signal. A synchronous signal detector 32 is adapted to detect a synchronous signal from the compensated signal from the reproduction amplifier/equalizer circuit 31 to stabilize a reproduction operation. An output signal from the synchronous signal detector 32 is rearranged into its original format by a reproduction formatter 33 and then demodulated by a demodulator 34. The demodulated signal from the demodulator 34 is deinterleaved by a deinterleaver 35 and then outputted through the interface 21 to the receiver 16 in the HDTV system.

In the recording and playback modes, a capstan motor 28 is rotated under a control of a capstan motor controller 27 to drive the capstan 5. The video tape 26 is moved as the capstan 5 is driven. Also, a drum motor 30 is rotated under a control of a drum motor controller 29 to drive the head drum 1. As a result, normal recording, normal playback or speed change playback is performed as the head drum 1 is driven.

The operation of the digital VCR with the above-mentioned construction will hereinafter be described with reference to FIG. 2 and FIGS. 3A to 3C.

FIG. 2 is a view illustrating a recording format of the video tape 26 in accordance with the prior art, FIG. 3A is a view illustrating a head trace of the video tape 26 in a still playback mode in accordance with the prior art, FIG. 3B is a view illustrating a head trace of the video tape 26 in a fast forward playback mode in accordance with the prior art and FIG. 3C is a view illustrating a head trace of the video tape 26 in a fast reverse playback mode in accordance with the prior art.

When moving along the head drum 1, the video tape 26 is wound on the head drum 1 in the order of 180°. Under this condition, data is alternately recorded and reproduced on/from the video tape 26 by the recording and reproduction heads (not shown). The recording and reproduction heads have an azimuth angle of about 6° with respect to each other for prevention of an interference in the data recording and reproduction.

In FIG. 2, each video track has an angle of inclination of 5° 58' 9.9" to a head travelling direction in a helical manner. In such a helical manner, the video signal is recorded in the unit of field on each track of the video tape 26. In the playback mode, the capstan motor 28 is rotated under the control of the capstan motor controller 27 so that a travelling speed of the video tape 26 can be varied. Also, the drum motor 30 is rotated under the control of the drum motor controller 29 so that the reproduction of the video signal from the video tape 26 can selectively be performed in the still, fast forward and fast reverse playback modes as shown in FIGS. 3A to 3C.

In the normal playback mode, a relative speed of the drum 1 and the video tape 26 is 5.8 m/s and a travelling speed of the video tape 26 is 33.55 mm/s.

In the speed change playback mode, the drum 1 is rotated at a fixed speed under the control of the drum motor controller 29, whereas the rotation speed of the capstan motor 28 is varied under the control of the capstan motor controller 27 to adjust the travelling speed of the video tape 26.

In the still playback mode, the video signal is reproduced under the condition that the video tape 26 is stopped. In this case, a scanning point of the reproduction head misses somewhat the corresponding track of the video tape 26 as shown in FIG. 3A, resulting in noise being mixed with a reproduced picture. In the fast forward and reverse playback modes as shown in FIGS. 3B and 3C, the travelling speed of the video tape 26 is seven times that of the normal playback mode.

In the general HDTV system, intra-frame and inter-frame coding processes are performed for the data compression in the transmission part. The intra-frame coding is to compress data in one frame, whereas the inter-frame coding is to compress data according to a difference between the adjacent frames. The compressed data is recorded on the video tape 26. In this connection, a video field seen at the camera 11 or the monitor 18 is different from that at the transmitter 13 or the receiver 16.

The compressed data from the receiver 16 is recorded in the digital VCR 19. As a result, one field of the data recorded in the digital VCR 19 may be smaller or larger than that on the monitor 18 according to a compressed degree. Namely, one video field recorded on the video tape is not the same as that on a screen of the monitor 18.

For this reason, in the digital VCR, a video picture cannot be formed by a reproduction of only a part of one field such as a fast reproduction of a VHS system. Also, the video picture cannot be reproduced as it is, in the case where the VCR skips even one frame among inter-frame coded data. Further, in the HDTV system, data of a first line on the data field may be not exactly in accord with a start point of the upper left side of the screen. Moreover, in the HDTV system, the video signal is mainly compressed by the inter-frame coding, which applies a lot of restrictions for editing and the speed change playback of the digital VCR. Also, the intra-frame coding is performed only in a video variation.

As a result, the conventional digital VCR is desirable to perform the still playback mode and a slow playback mode of the video signal from the HDTV system, but has the disadvantage that it cannot perform the fast forward and reverse playback modes of the video signal from the HDTV system.

SUMMARY OF THE INVENTION

Therefore, the present invention has been made in view of the above problems, and it is an object of the present invention to provide a method of reproducing a video signal in a digital VCR in which intra-frame coding is performed at an interval of N frames and a speed of a capstan motor is varied according to playback modes, so that editing and speed change modes of the digital VCR can be performed in the basic unit of the coded Lth frame.

In accordance with the present invention, the above and other objects can be accomplished by provision of a method of reproducing a video signal in a digital video cassette recorder, comprising the steps of performing intra-frame coding at an interval of a predetermined number of frames of the video signal to compress the video signal and recording the compressed video signal on a video tape; and (b) varying a travelling speed of the video tape according to a desired one of normal, still, fast forward jump, fast reverse jump, slow forward and slow reverse playback modes to reproduce the video signal recorded on the video tape in the desired playback mode.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and advantages of the present invention will be more clearly understood from the following detailed description taken in conjunction with the accompanying drawings which are given by way of illustration only, and thus are not limitative of the present invention, and, in which.

DETAILED DESCRIPTION OF THE PREFERRED EMBODIMENT

Figure 5:
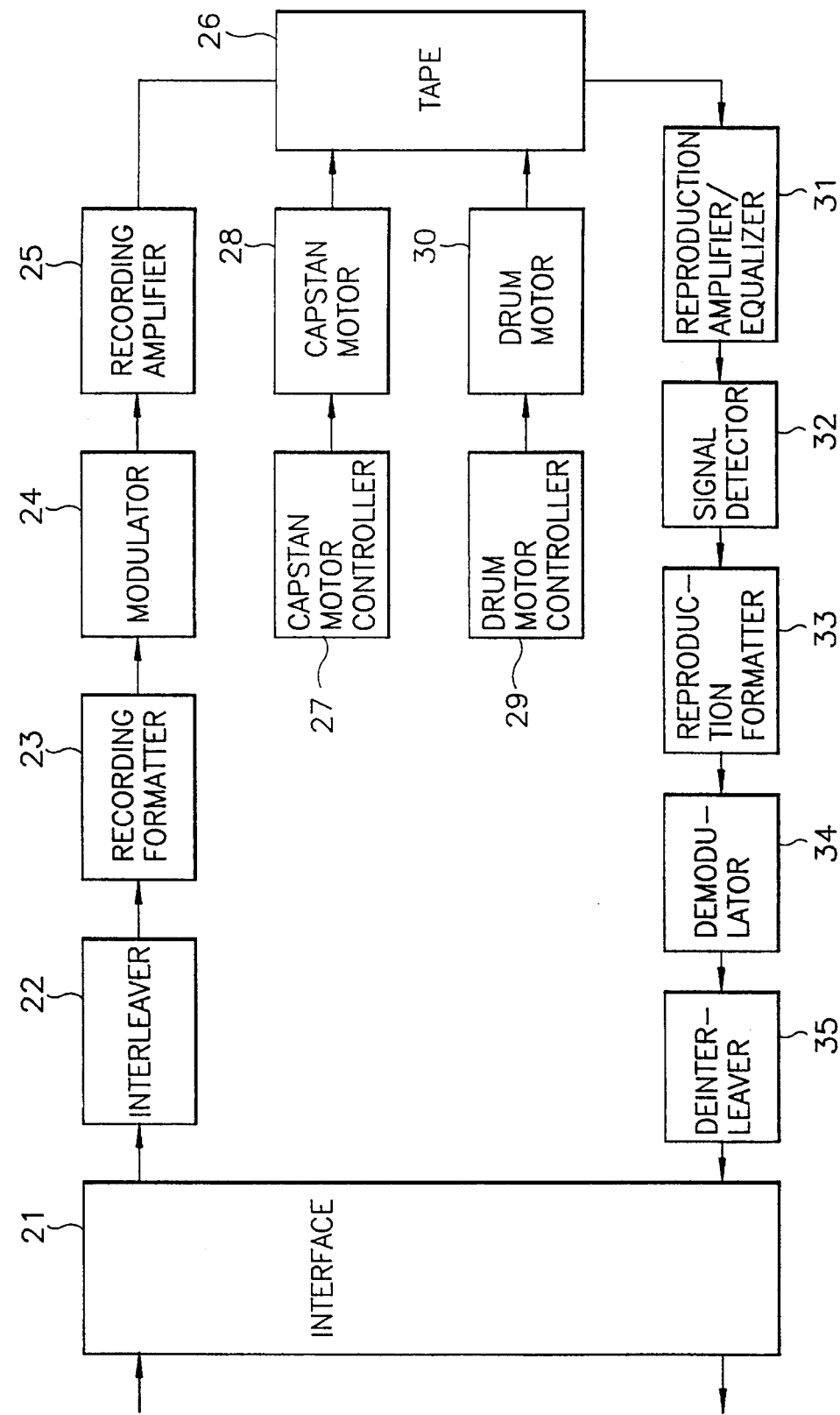
FIG. 5 is a detailed block diagram of a conventional digital VCR.

The digital VCR as shown in FIG. 5 is applied to the present invention, but characteristics of the interleaver 22, the deinterleaver 35, the capstan motor controller 27 and the drum motor controller 29 are enhanced according to the present invention. In particular, the interleaver 22 and the deinterleaver 35 are adapted to process video data in the unit of ½ field or one field. Also, according to the present invention, two heads are used to record one data field on each track of the video tape.

Also, according to the present invention, the rotation speed of the capstan motor 28 is controlled under the control of the capstan motor controller 27 to control the travelling speed of the video tape according to the normal, fast forward jump, fast reverse jump and still playback modes.

A method of reproducing the video signal in the digital VCR with the above-mentioned construction in accordance with the present invention will hereinafter be described in detail with reference to FIGS. 6 to 13.

Figure 6:
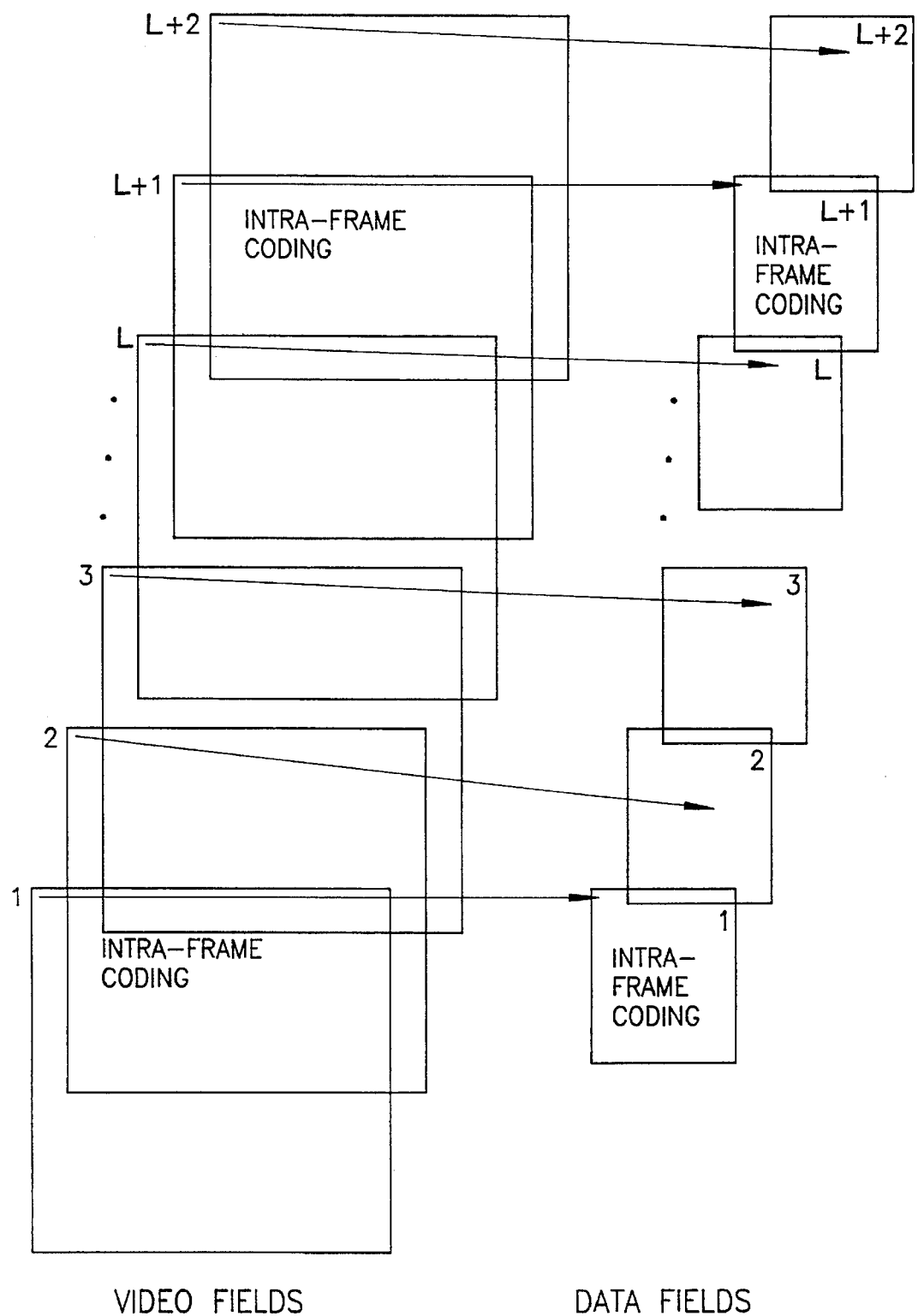
FIG. 6 is a view illustrating frame coding in accordance with the present invention.

FIG. 6 is a view illustrating frame coding in accordance with the present invention. As shown in this drawing, according to the present invention, the intra-frame coding is performed at an interval of L (a natural number greater than or equal to 2) frames. Coded Nth frame becomes first video data of a transmitted data. Therefore, editing and speed change modes of the digital VCR can be performed in the basic unit of the coded Lth frame.

In the still playback mode of the present invention, the capstan motor 28 is stopped under the control of the capstan motor controller 27 after reproduction of one data field, thereby causing the travelling of the video tape 26 to be stopped. A control signal is given such that the previous data field is repeatedly reproduced to the monitor 18 until the subsequent reproduction signal is generated.

The control signal is generated by setting a leak factor a to "1" and setting a motion vector and a quantized coefficient to "0". Noticeably, if the leak factor a is "0", the intra-frame coding is performed. On the contrary, if the leak factor a is "1", the inter-frame coding is performed.

Figure 9:
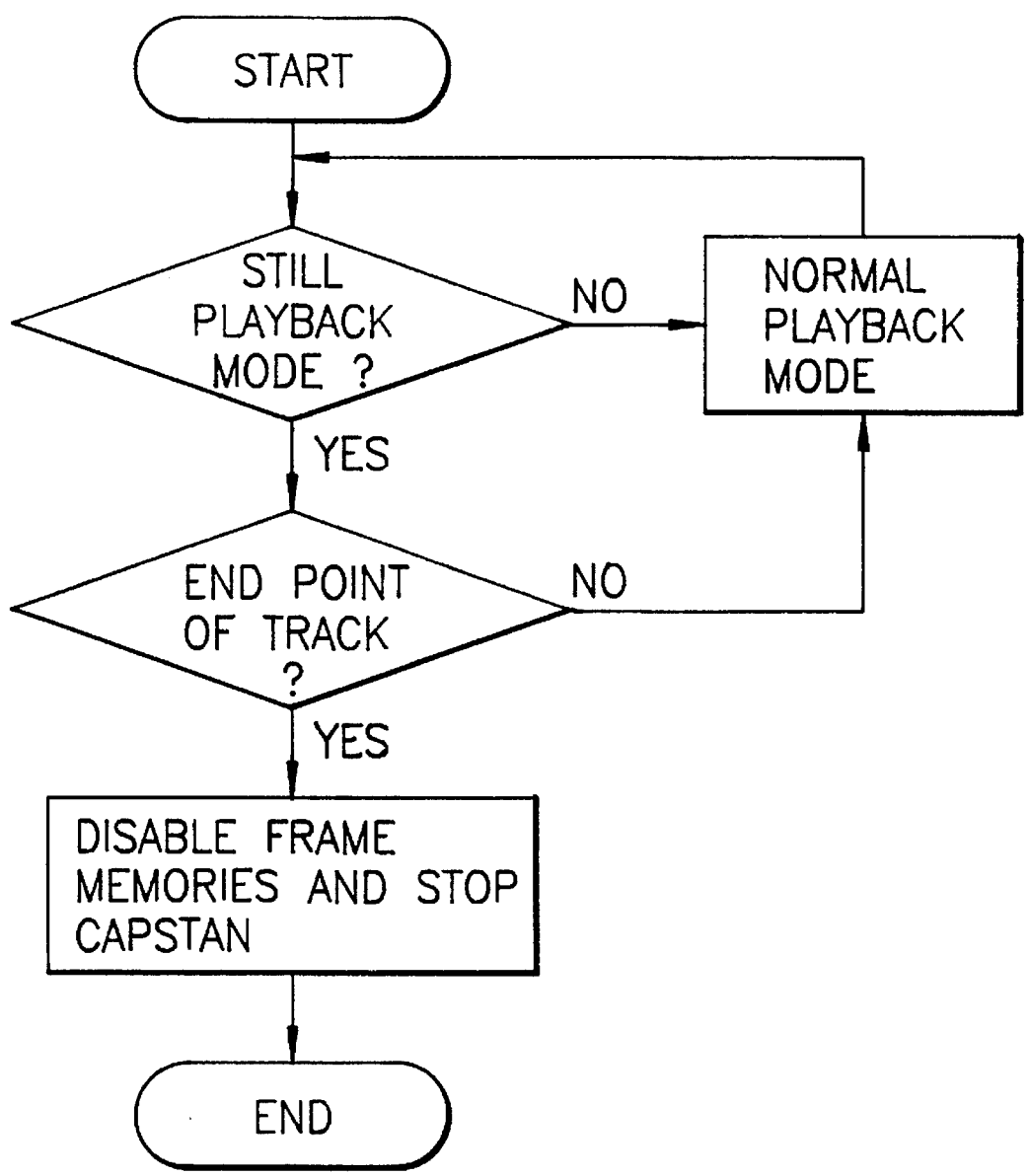
FIG. 9 is a flowchart illustrating a still playback mode in accordance with the present invention.

The still playback mode of the present invention will hereinafter be described in detail with reference to FIG. 9, which is a flowchart illustrating the still playback mode in accordance with the present invention.

First, under the condition that the normal playback mode is performed, it is discriminated whether the present mode is the still playback mode. If it is discriminated that the present mode is not the still playback mode, the discrimination is continuously made while the normal playback mode is performed. On the contrary, if it is discriminated that the present mode is the still playback mode, a discrimination is made whether the present track position is an end point of the corresponding track.

In the case where the present track position is not the end point of the corresponding track, it is discriminated whether the present mode is the still playback mode, under the condition that the normal playback mode is performed. On the contrary, when it is discriminated that the present track position is the end point of the corresponding track, all frame memories (not shown) are disabled and the capstan motor 28 is stopped. Namely, the travel of the video tape is stopped upon detection of the end point of the track while the normal playback mode is performed.

In a slow forward playback mode of the present invention, the reproduction and stop operations are repeatedly performed in the unit of field. In this case, the present field data is read by one of two heads and the subsequent field data is read by the other head. The two heads have a desired azimuth angle with respect to each other.

A period of the stop operation in the slow forward playback mode must become an even number multiple of one field to be reproduced. Namely, at a ⅓ multi-speed, the stop operation is performed for an interval of two fields after reproduction of one data field. At a ⅕ multi-speed, the stop operation is performed for an interval of four fields after reproduction of one data field. Also, at a ⅐ multi-speed, the stop operation is performed for an interval of six fields after reproduction of one data field. On the other hand, at a ⅑ multi-speed, the stop operation is performed for an interval of eight fields after reproduction of one data field.

In the same manner as that in the still playback mode, the previous data field is repeatedly reproduced for the period of the stop operation in the slow forward playback mode. Different multi-speeds may be produced by combining the above-mentioned multi-speeds. For example, combining a 1 multi-speed with the ⅓ multi-speed, the recording signal can be reproduced at a ⅔ multi-speed.

Figure 10:
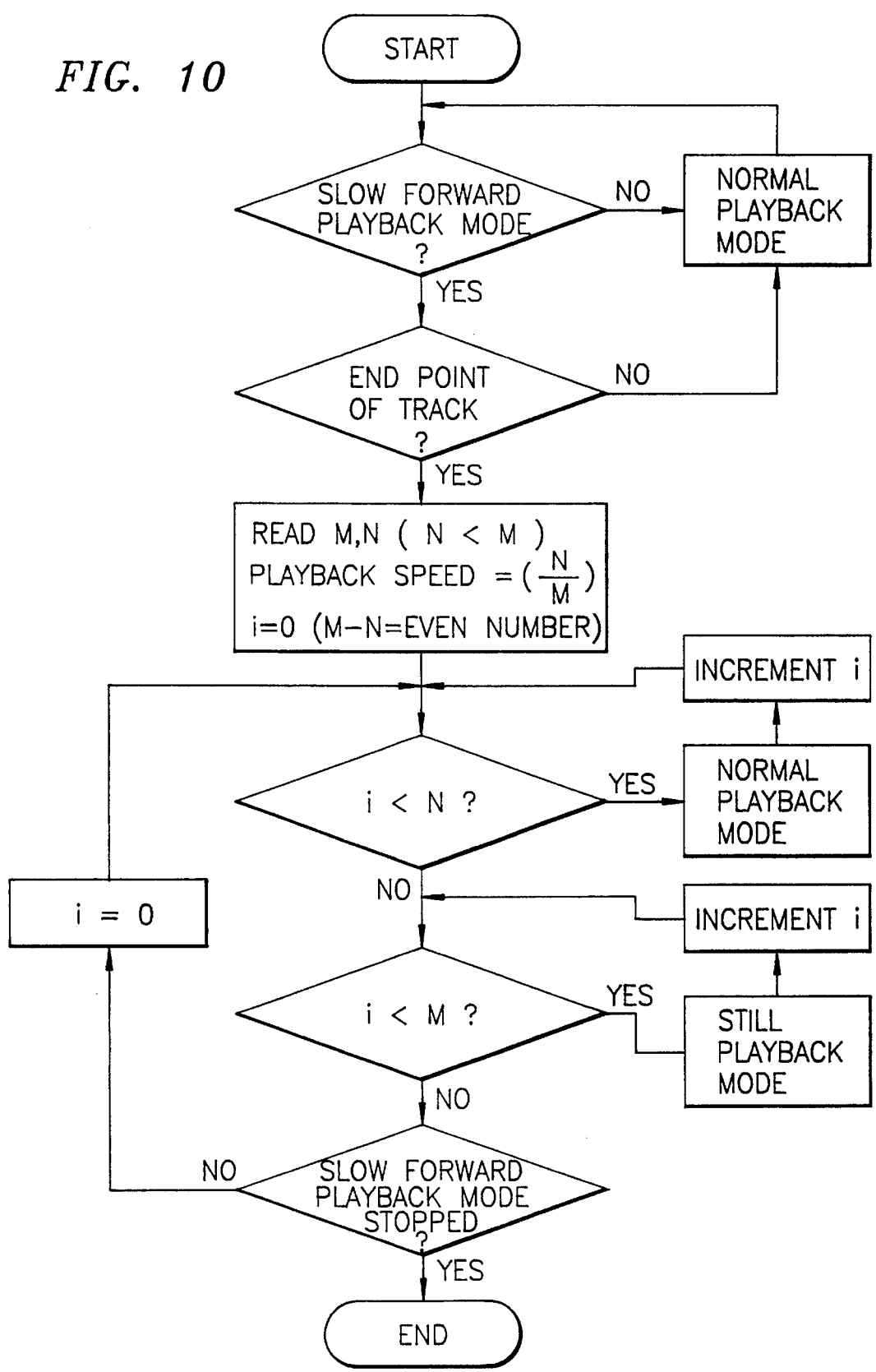
FIG. 10 is a flowchart illustrating a slow forward playback mode in accordance with the present invention.

The slow forward playback mode of the present invention will hereinafter be described in detail with reference to FIG. 10, which is a flowchart illustrating the slow forward playback mode in accordance with the present invention.

First, under the condition that the normal playback mode is performed, it is discriminated whether the present mode is the slow forward playback mode. If it is discriminated that the present mode is not the slow forward playback mode, the discrimination is continuously made while the normal playback mode is performed. On the contrary, if it is discriminated that the present mode is the slow forward playback mode, a discrimination is made whether the present track position is an end point of the corresponding track.

When the present track position is not the end point of the corresponding track, it is discriminated whether the present mode is the slow forward playback mode, under the condition that the normal playback mode is performed. On the contrary, when it is discriminated that the present track position is the end point of the corresponding track, M and N are read. Here, assume that a slow forward playback speed is N/M, M>N and M–N=even number. Then, i is set to "0" and it is discriminated whether N is greater than i. If N>i, the normal playback mode is performed and then i is incremented. If not so, it is discriminated whether M is greater than i.

If M is greater than i, the still playback mode is performed and i is then incremented. If not so, it is discriminated whether the slow forward playback mode is to be stopped. If it is discriminated that the slow forward playback mode is not to be stopped, i is set to "0" and the operation is returned to the above step of comparing N with i. In the case where it is discriminated that the slow forward playback mode is to be stopped, the slow forward playback mode is stopped.

Figure 1:
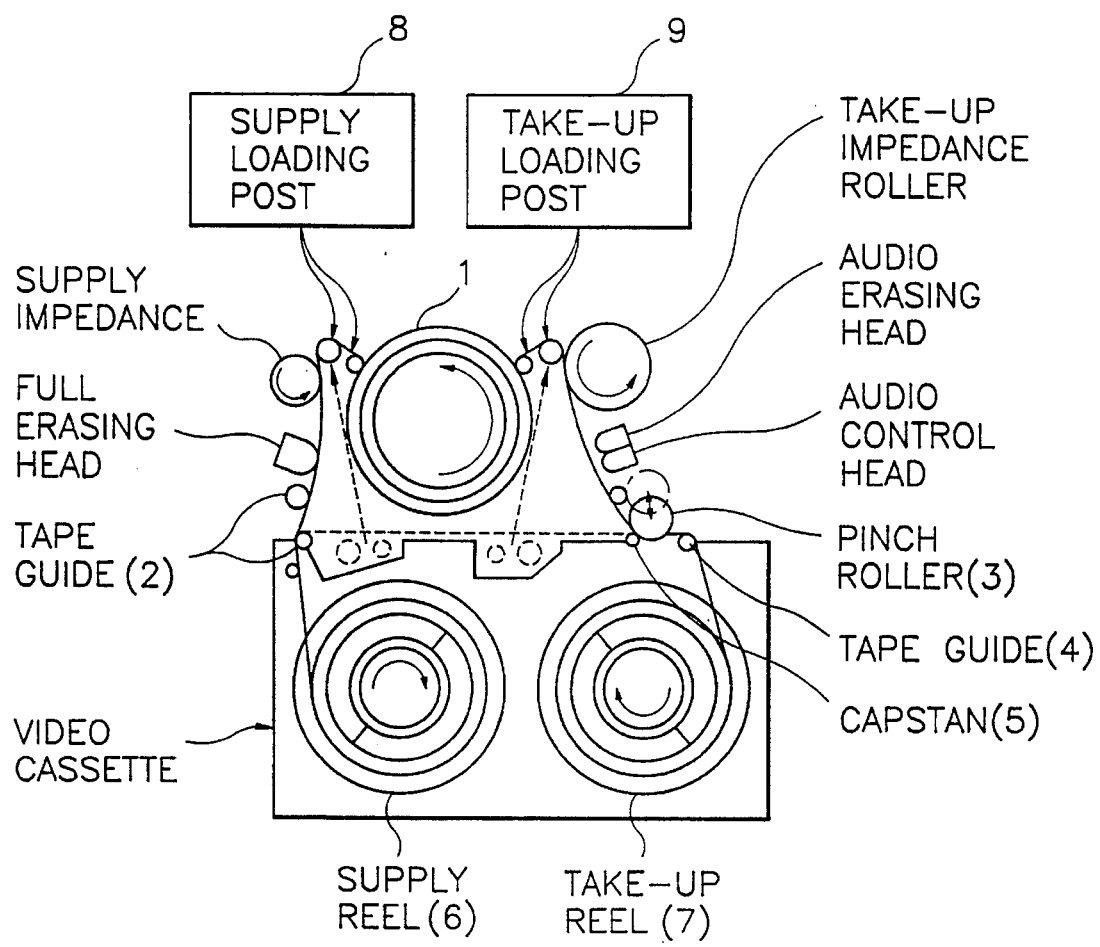
FIG. 1 is a schematic view illustrating a general tape travelling system of a VCR.
Figure 2:
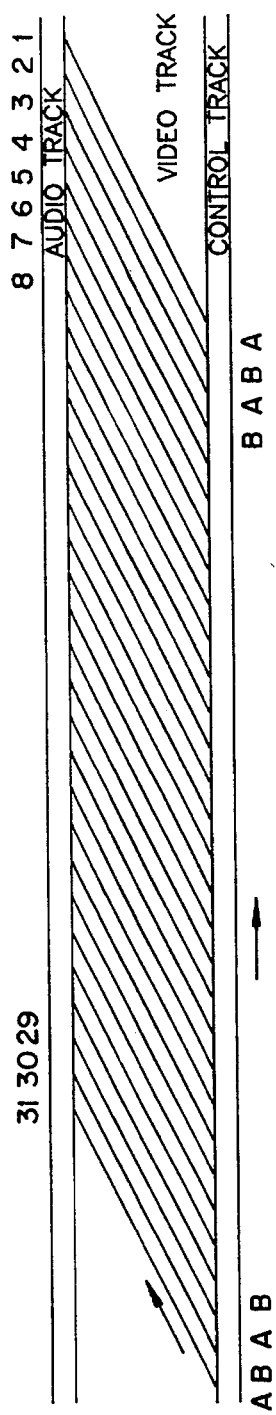
FIG. 2 is a view illustrating a recording format of a video tape in accordance with the prior art.
Figure 3A:
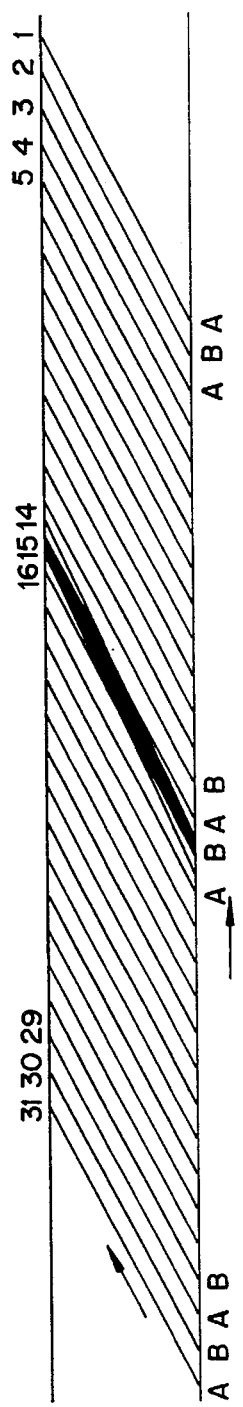
FIG. 3A is a view illustrating a head trace of the video tape in a still playback mode in accordance with the prior art.
Figure 3B:
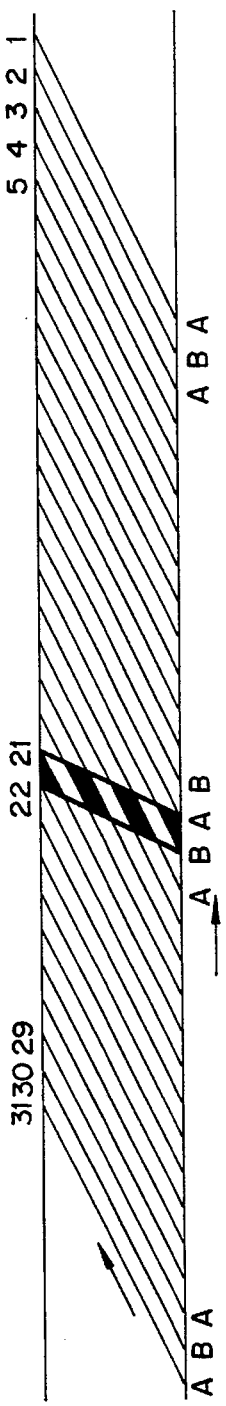
FIG. 3B is a view illustrating a head trace of the video tape in a fast forward playback mode in accordance with the prior art.
Figure 3C:
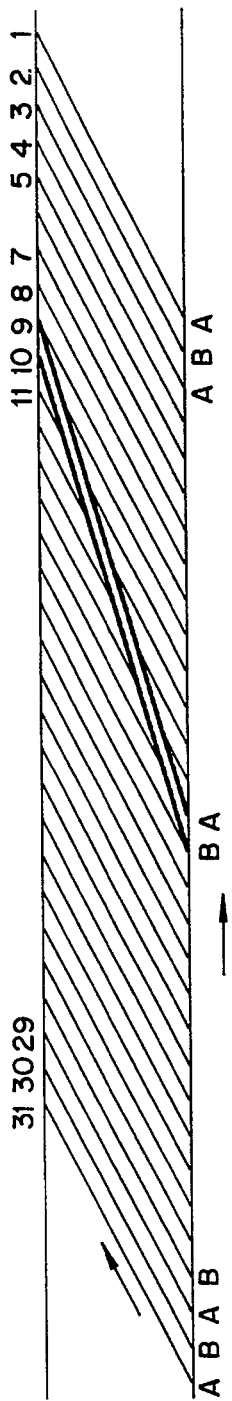
FIG. 3C is a view illustrating a head trace of the video tape in a fast reverse playback mode in accordance with the prior art.
Figure 4:
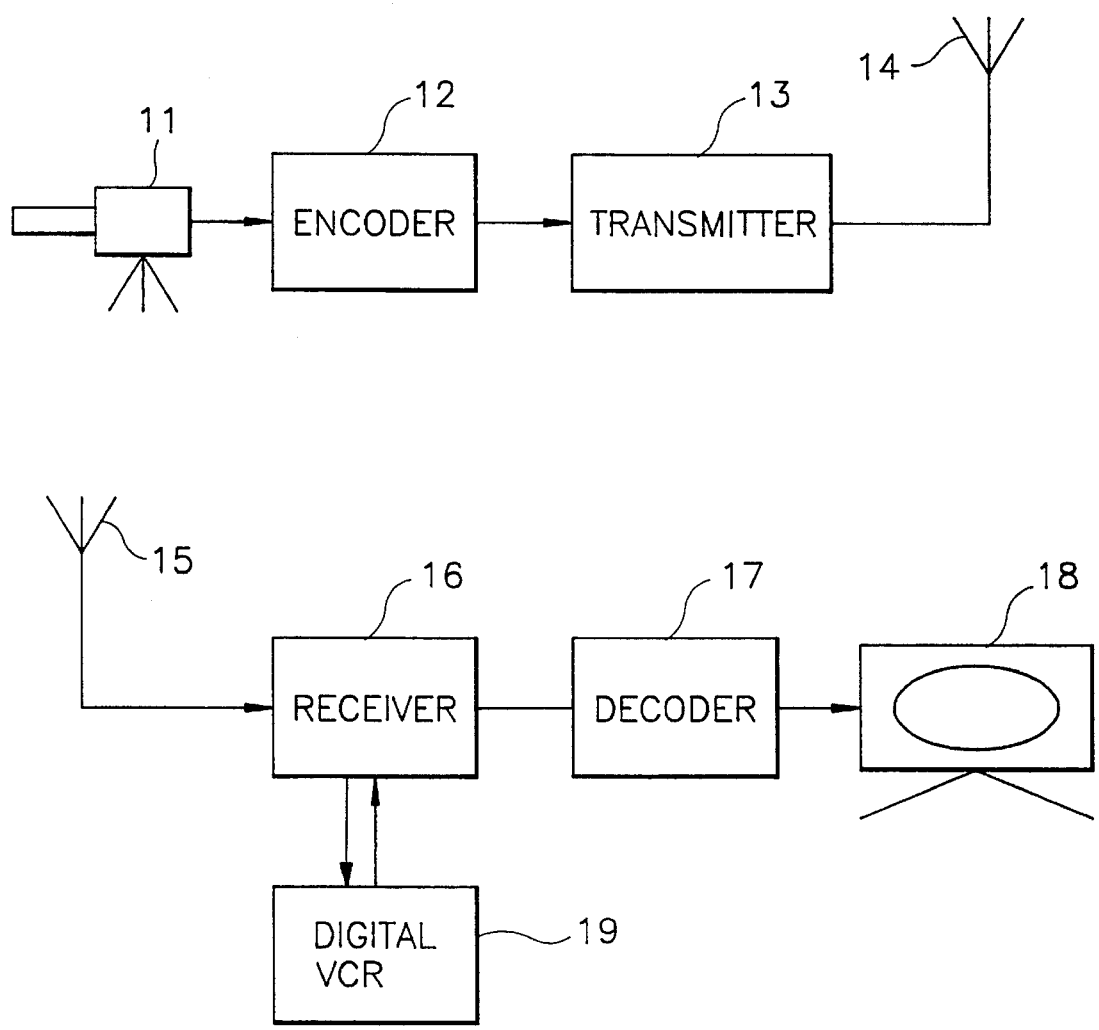
FIG. 4 is a schematic block diagram of a general HDTV system.

In performing a slow reverse playback mode in accordance with the present invention, there are required memories of the number equal to that of the frames in the intra-frame coding interval. In the conventional HDTV system as shown in FIG. 4, one frame memory is included in the decoder 17. In accordance with the present invention, the decoder 17 must include L frame memories. Assuming that L=15, a memory capacity is required to store decoded data of 15 frames.

For example, data scanning is sequentially performed from a 16th data field to a 30th data field in the normal playback mode. The scanned data are decoded and then stored in the memories. Then, the stored data are sequentially outputted from the memories in the reverse order such as frames 30, 29, . . . , 16 at a desired speed. In this case, the detected frame can repeatedly reproduced at the desired speed.

Upon completion of the data scanning up to the 30th data field, the data scanning jumps back to a data field "1" at a high speed, so that it can sequentially be performed from the first data field to a 15th data field in the normal playback mode. The scanned data are decoded and then stored in the memories. Then, the reproduction of the data from the memories is performed in the same manner as mentioned above.

It should be noted that the digital VCR and the HDTV system cannot be operated independently of each other. Namely, the digital VCR outputs information regarding the slow reverse playback mode of a desired multi-speed and the HDTV system receives the output information from the digital VCR. Also, the HDTV system must store the output information from the digital VCR and perform the playback operation according to the stored information. Hence, the HDTV system and the digital VCR must systematically be operated. In particular, the HDTV system must be made in consideration of even the reverse function of the digital VCR.

Figure 11:
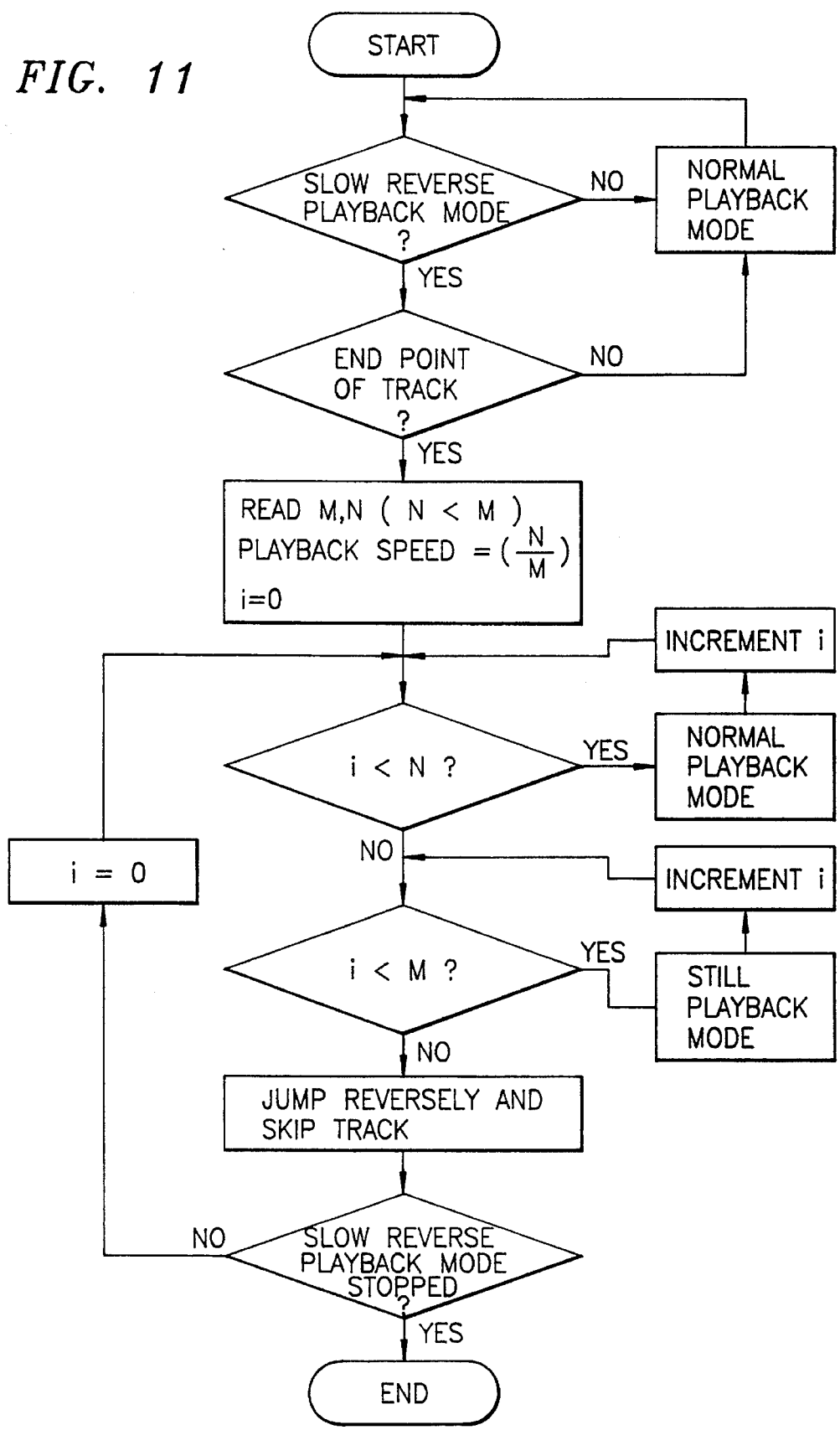
FIG. 11 is a flowchart illustrating a slow reverse playback mode in accordance with the present invention.

The slow reverse playback mode of the present invention will hereinafter be described in detail with reference to FIG. 11, which is a flowchart illustrating the slow reverse playback mode in accordance with the present invention.

First, under the condition that the normal playback mode is performed, it is discriminated whether the present mode is the slow reverse playback mode. If it is discriminated that the present mode is not the slow reverse playback mode, the discrimination is continuously made while the normal playback mode is performed. On the contrary, if it is discriminated that the present mode is the slow reverse playback mode, a discrimination is made whether the present track position is an end point of the corresponding track.

In the case where the present track position is not the end point of the corresponding track, it is discriminated whether the present mode is the slow reverse playback mode, under the condition that the normal playback mode is performed. On the contrary, when it is discriminated that the present track position is the end point of the corresponding track, M and N are read. Here, assume that a slow reverse playback speed is N/M and M>N. Then, i is set to "0" and it is discriminated whether N is greater than i. If N>i, the normal playback mode is performed and then i is incremented. If not so, it is discriminated whether M is greater than i.

If M is greater than i, the still playback mode is performed and i is then incremented. If not so, the video tape is rewound for track skip for the time interval of one field. Then, it is discriminated whether the slow reverse playback mode is to be stopped. If it is discriminated that the slow reverse playback mode is not to be stopped, i is set to "0" and the operation is returned to the above step of comparing N with i. In the case where it is discriminated that the slow reverse playback mode is to be stopped, the slow reverse playback mode is stopped.

In the conventional VHS system, the fast forward playback mode is performed by increasing the travelling speed of the video tape by twice or three times that of the normal playback mode of this invention. In the fast forward playback mode, several fields are skipped for an interval of one field reproduction to form a video picture.

By the way, because the data is inter-frame coded in the digital VCR, the fast forward playback mode is performed by skipping several fields instantaneously in the middle of continuously reading the data after the intra-frame coded data, to pass into the subsequent intra-frame coded field. In this case, the travelling speed of the video tape may include two speeds or the normal playback speed and the fast forward jump speed.

Figure 7A:
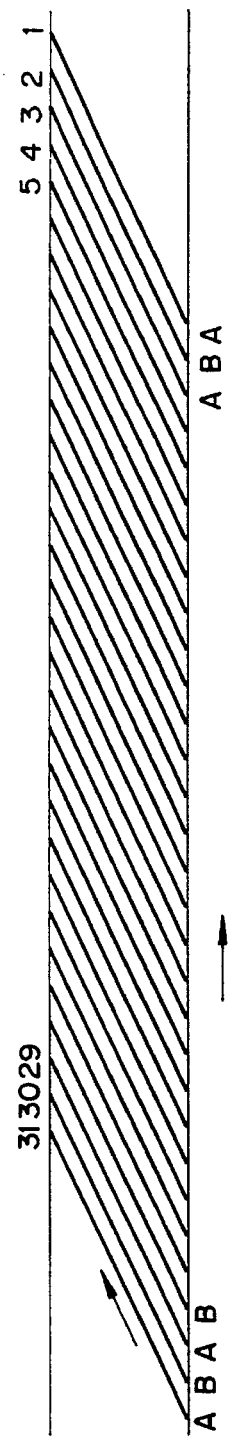
FIGS. 7A to 7H are views illustrating head traces of the video tape in a fast forward playback mode in accordance with the present invention.
Figure 7B:
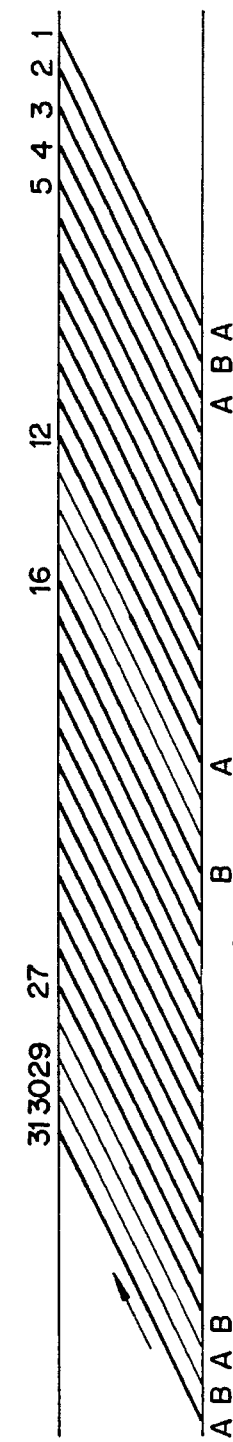
Figure 7C:
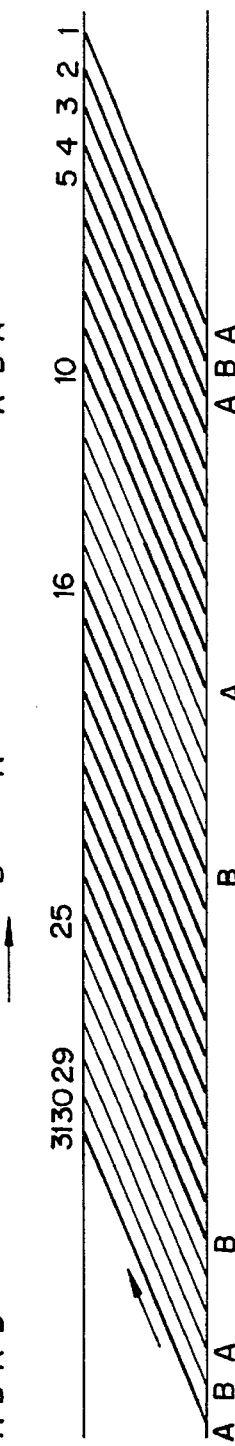
Figure 7D:
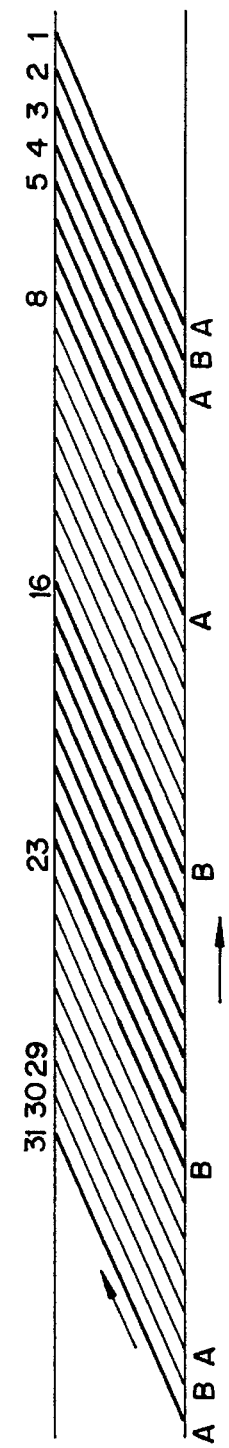
Figure 7E:
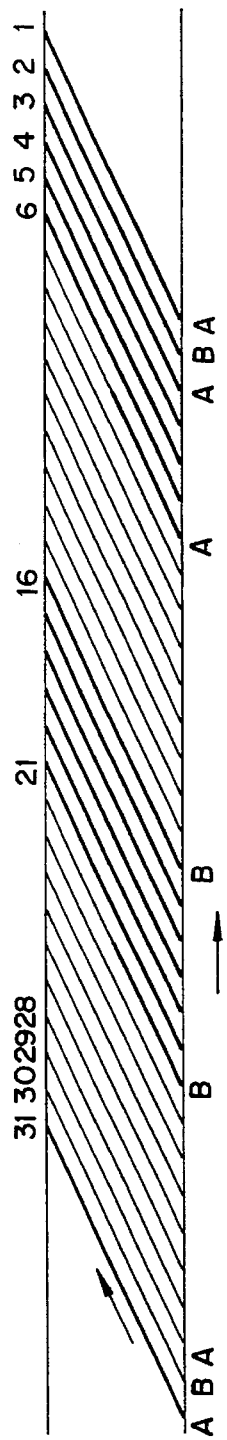
Figure 7F:
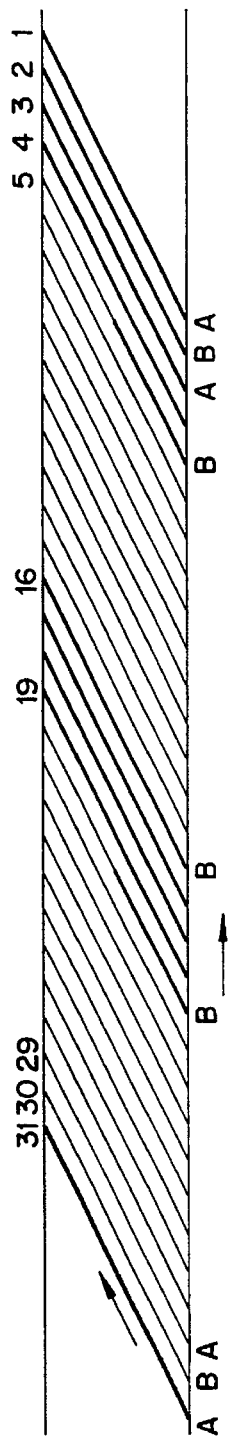
Figure 7G:
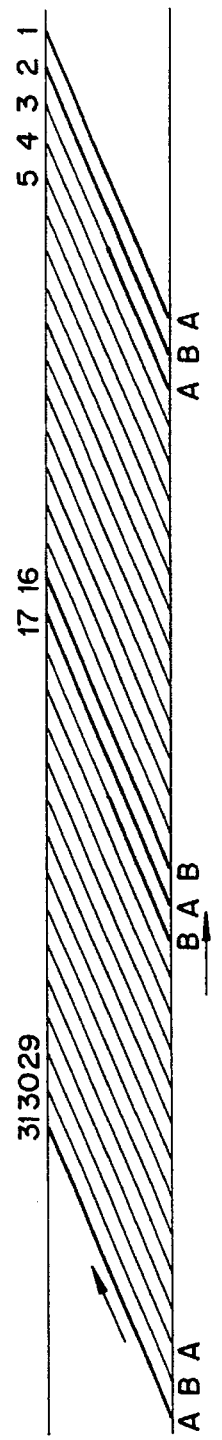
Figure 7H:
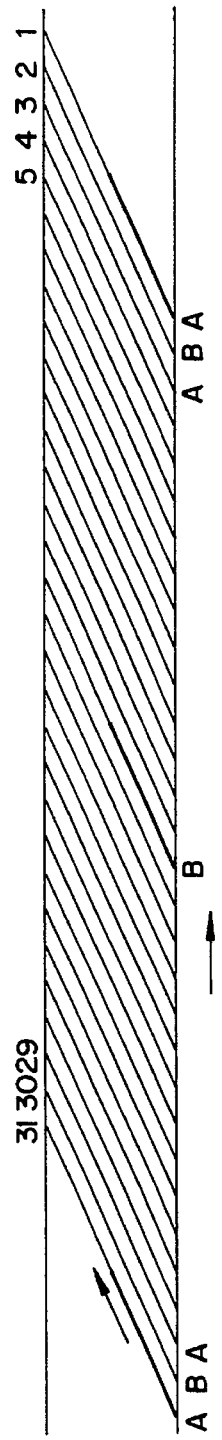

FIGS. 7A to 7H are views illustrating head traces of the video tape in the fast forward jump mode in accordance with the present invention. For example, assume that the intra-frame coded data is generated at an interval of 15 (L= 15) frames, the fast forward jump speed is 30 times that of the normal playback mode at the maximum and the interleaving is performed in the unit of ½ field. In this case, at a 15/13 multi-speed as shown in FIG. 7B, the normal playback is performed for an interval of 12.5 fields beginning with the first field and the fast forward jump is performed for an interval of the remaining 0.5 field to skip 2.5 fields, so as to pass into the subsequent 16th field. At a 15/11 multi-speed as shown in FIG. 7C, the normal playback is performed for an interval of 10.5 fields and the fast forward jump is performed for an interval of the remaining 0.5 field to skip 4.5 fields. Although not described, FIGS. 7D to 7H illustrate fields to be reproduced and skipped at 15/9 (1.67), 15/7 (2.14), 3, 5 and 15 multi-speeds, respectively. At all the multi-speeds, the fast forward jump is performed for the interval of ½ field to pass into the subsequent intra-frame coded portion. In this interval, a control signal is given such that the previous data field is repeatedly reproduced, similarly to that in the still playback mode.

Figure 12:
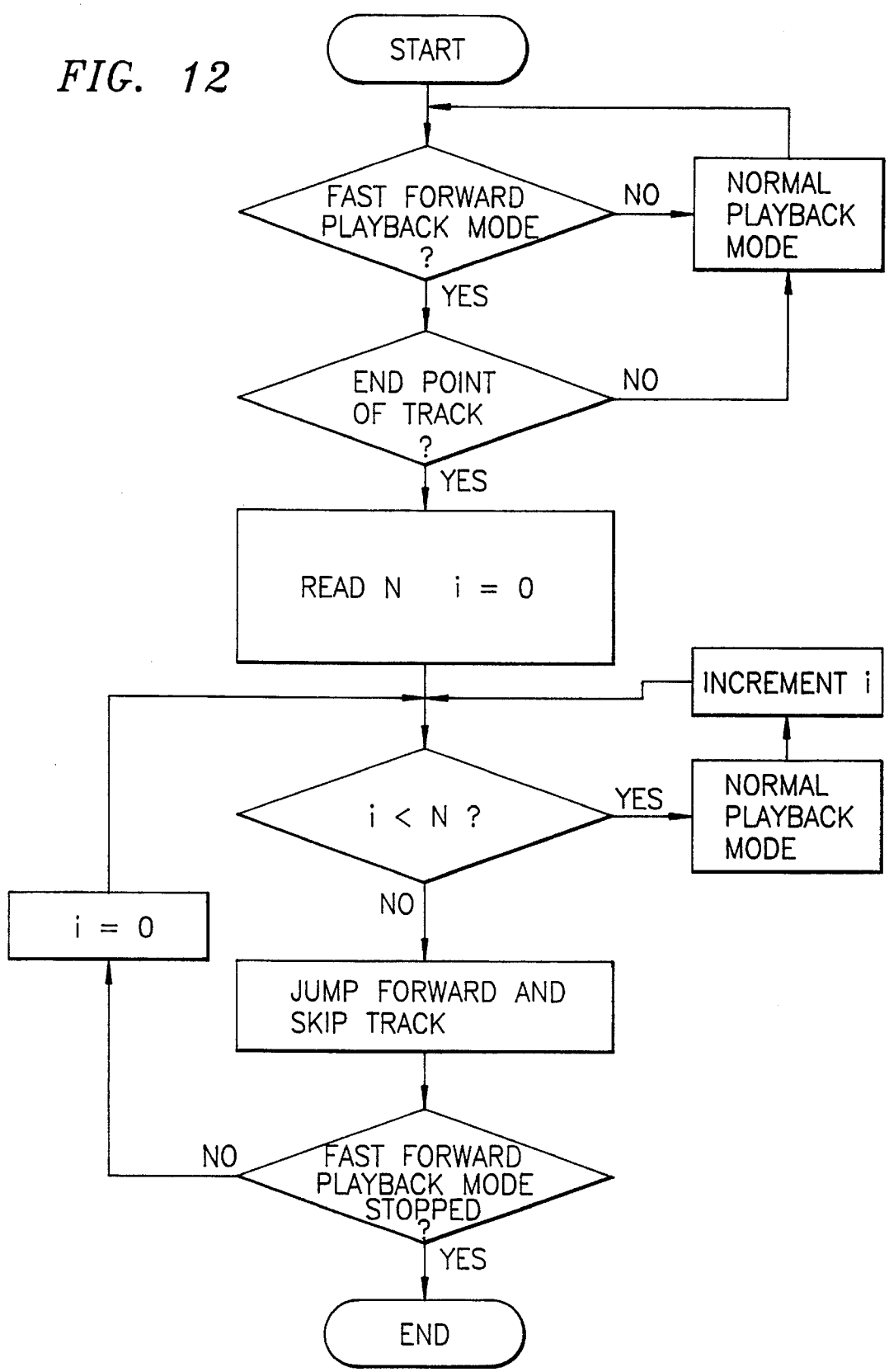
FIG. 12 is a flowchart illustrating the fast forward playback mode in accordance with the present invention.

The fast forward playback mode of the present invention will hereinafter be described in detail with reference to FIG. 12, which is a flowchart illustrating the fast forward playback mode in accordance with the present invention.

First, under the condition that the normal playback mode is performed, it is discriminated whether the present mode is the fast forward playback mode. If it is discriminated that the present mode is not the fast forward playback mode, the discrimination is continuously made while the normal playback mode is performed. On the contrary, if it is discriminated that the present mode is the fast forward playback mode, a discrimination is made whether the present track position is an end point of the corresponding track.

When the present track position is not the end point of the corresponding track, it is discriminated whether the present mode is the fast forward playback mode, under the condition that the normal playback mode is performed. On the contrary, when it is discriminated that the present track position is the end point of the corresponding track, N are read and i is set to "0". Then, it is discriminated whether N is greater than i. If N>i, the normal playback mode is performed and then i is incremented.

If N is smaller than i, the video tape is moved fast forward to pass into the subsequent intra-frame coded field. Then, it is discriminated whether the fast forward playback mode is to be stopped. If it is discriminated that the fast forward playback mode is not to be stopped, i is set to "0" and the operation is returned to the above step of comparing N with i. In the case where it is discriminated that the fast forward playback mode is to be stopped, the fast forward playback mode is stopped.

Figure 8A:
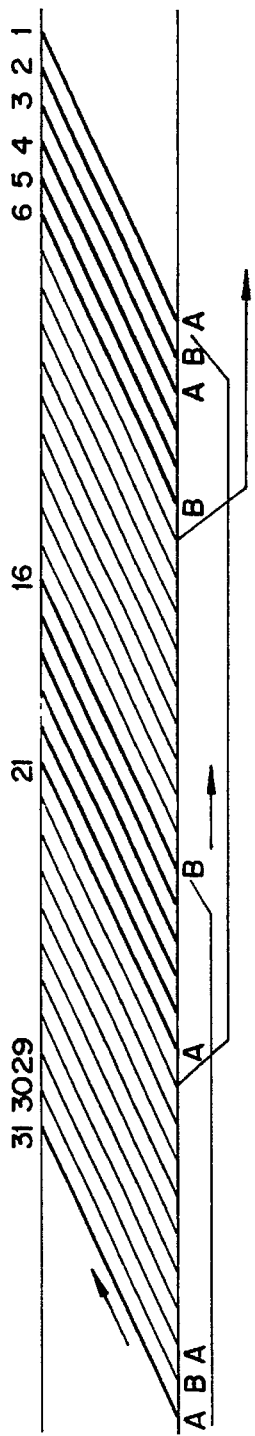
FIGS. 8A to 8F are views illustrating head traces of the video tape in a fast reverse playback mode in accordance with the present invention.
Figure 8B:
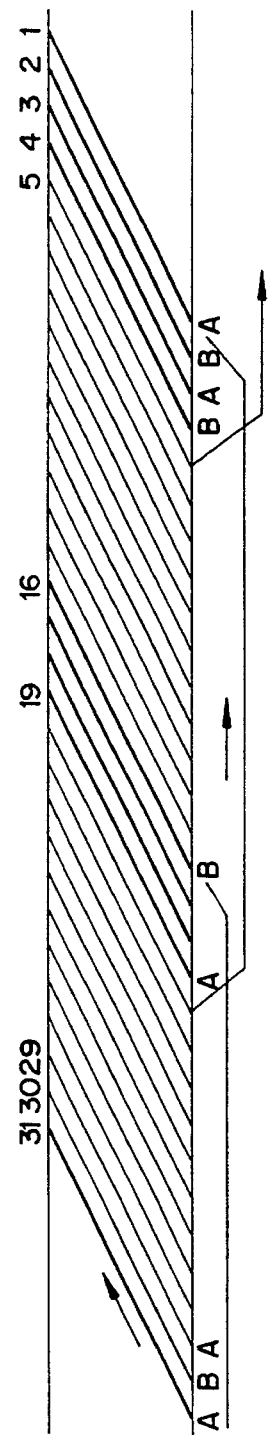
Figure 8C:
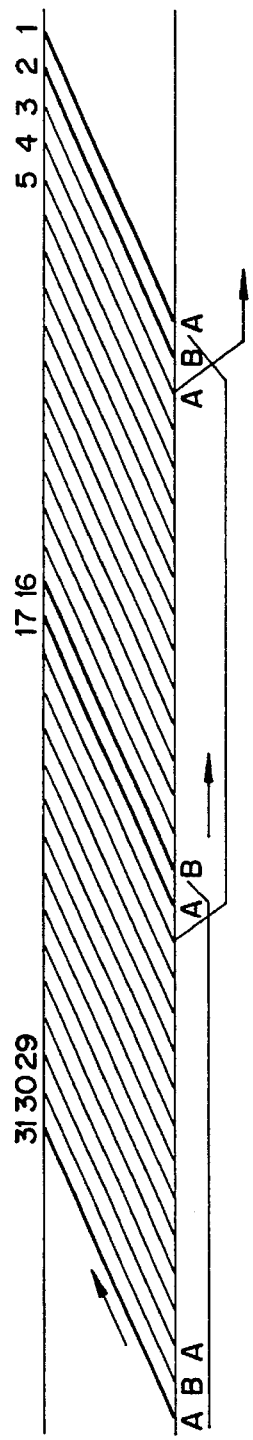
Figure 8D:
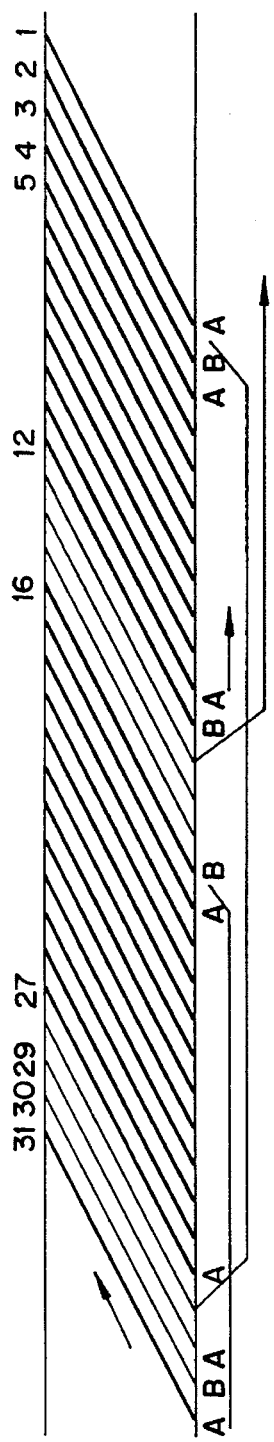
Figure 8E:
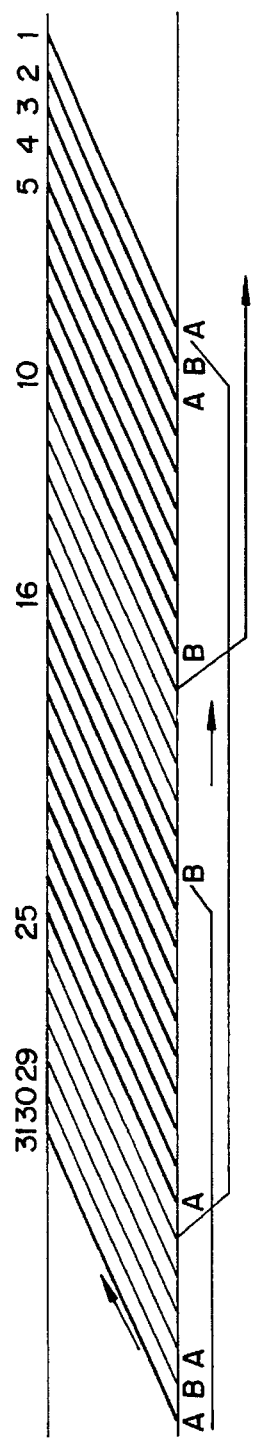
Figure 8F:
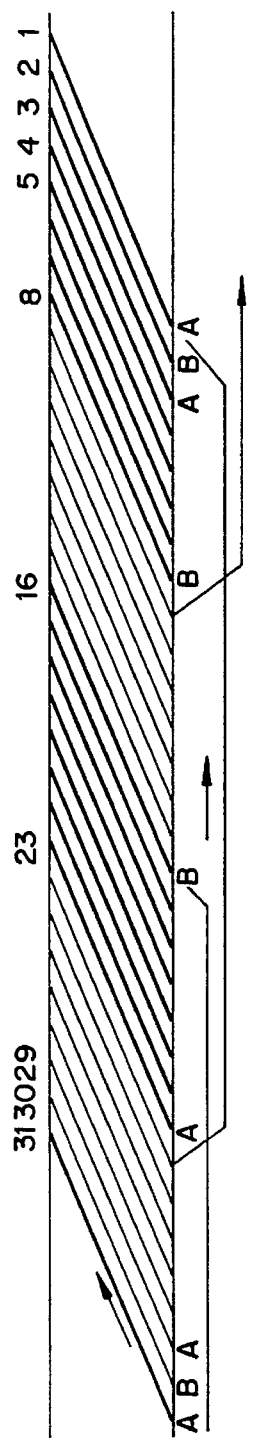

In accordance with the present invention, the fast reverse playback mode includes a series of the normal and fast reverse jump operations. FIGS. 8A to 8F are views illustrating head traces of the video tape in the fast reverse playback mode in accordance with the present invention. For example, at a 5 multi-speed as shown in FIG. 8F, the normal playback is performed for an interval of the 16th field (the start field of the intra-frame coding interval) and the 17th field. Then, the fast reverse jump to the first field (the start field of the previous intra-frame coding interval) is performed to reproduce the first and second fields.

In this case, two frame memories must be provided in the decoder 17. With the two frame memories used, the 17th and 16th frames are outputted and the 16th frame thereof is outputted once more again. Then, the second and first frame are outputted.

In the case where only one frame memory is present in the decoder 17, the fast reverse playback mode is performed by outputting the 16th frame three times and displaying the first frame three times repeatedly.

The decoder 17 must have L (L=15) frame memories at the maximum to perform various fast reverse operations. Although not described, FIGS. 8A to 8E illustrate fields to be reproduced and skipped at 15/13, 15/11, 5/3, 15/7 and 3 multi-speeds, respectively.

In the same manner as that in the slow reverse playback mode, the digital VCR outputs information regarding the fast reverse playback mode of a desired multi-speed and the HDTV system receives the output information from the digital VCR. The HDTV system decodes the output information from the digital VCR and stores the decoded information in the memory. Then, the HDTV system performs the fast reverse playback operation according to the stored information.

Figure 13:
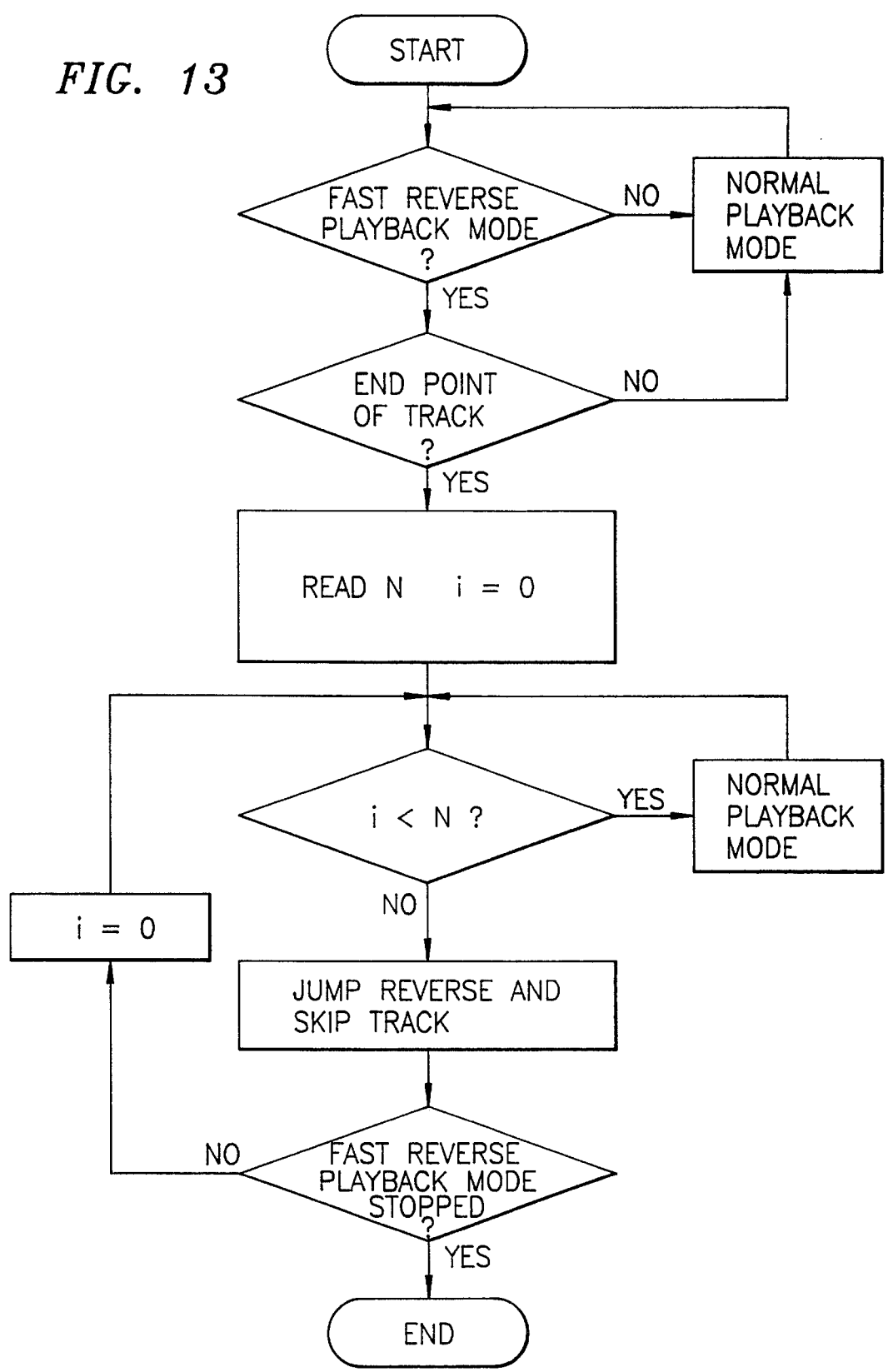
FIG. 13 is a flowchart illustrating the fast reverse playback mode in accordance with the present invention.

The fast reverse playback mode of the present invention will hereinafter be described in detail with reference to FIG. 13, which is a flowchart illustrating the fast reverse playback mode in accordance with the present invention.

First, under the condition that the normal playback mode is performed, it is discriminated whether the present mode is the fast reverse playback mode. If it is discriminated that the present mode is not the fast reverse playback mode, the discrimination is continuously made while the normal playback mode is performed. On the contrary, if it is discriminated that the present mode is the fast reverse playback mode, a discrimination is made whether the present track position is an end point of the corresponding track.

If the present track position is not the end point of the corresponding track, it is discriminated whether the present mode is the fast reverse playback mode, under the condition that the normal playback mode is performed. On the contrary, when it is discriminated that the present track position is the end point of the corresponding track, N are read and i is set to "0". Then, it is discriminated whether N is greater than i. If N>i, the normal playback mode is performed and then i is incremented.

In the case where N is smaller than i, the video tape is moved fast reverse to pass into the subsequent intra-frame coded field. Then, it is discriminated whether the fast reverse playback mode is to be stopped. If it is discriminated that the fast reverse playback mode is not to be stopped, i is set to "0" and the operation is returned to the above step of comparing N with i. In the case where it is discriminated that the fast reverse playback mode is to be stopped, the fast reverse playback mode is stopped.

As apparent from the above description, according to the present invention, the intra-frame coding is performed at an interval of L frames and the first slice data of the coded Lth frame becomes the first video data of the transmitted data field. Also, the speed of the capstan motor is varied according to various playback modes. Therefore, the editing and speed change modes of the digital VCR can be performed in the basic unit of the coded Lth frame.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of reproducing a video signal in a digital video cassette recorder, comprising the steps of:
   (a) performing intra-frame coding at an interval of a predetermined number of frames of the video signal to compress the video signal, and recording the compressed video signal on a video tape;
   (b) varying a travelling speed of the video tape according to a desired one of normal, still, fast forward jump, fast reverse jump, slow forward and slow reverse playback modes to reproduce the video signal recorded on the video tape in the desired playback mode;
   wherein step (b) includes the sub-steps of:
   (b-1) discriminating whether the present mode is the still playback mode, and if it is discriminated that the present mode is not the still playback mode, discriminating whether the present mode is the still playback mode under the condition that normal playback is performed;
   (b-2) if it is discriminated at said sub-step (b-1) that the present mode is the still playback mode, discriminating whether the present track position is an end point of a corresponding track and, if it is discriminated that the present track position in not the end point of the corresponding track, then discriminating whether the present mode is the still playback mode under the condition that the normal playback mode is performed; and
   (b-3) if it is discriminated at sub-step (b-2) that the present track position is the end point of the corresponding track, disabling all frame memories and stopping a capstan motor.

2. A method of reproducing a video signal in a digital video cassette recorder, comprising the steps of:
   (a) performing intra-frame coding at an interval of a predetermined number of frames of the video signal to compress the video signal, and recording the compressed video signal on a video tape;.
   (b) varying a travelling speed of the video tape according to a desired one of normal, still, fast forward jump, fast reverse jump, slow forward and slow reverse playback modes to reproduce the video signal recorded on the video tape in the desired playback mode;
   wherein step (b) includes the sub-steps of:
   (b-1) discriminating whether the present mode is the slow forward playback mode, and if it is discriminated that the present mode is not the slow forward playback mode, discriminating whether the present mode is the slow forward playback mode under the condition that normal playback is performed;
   (b-2) if it is discriminated at sub-step (b-1) that the present mode is the slow forward playback mode, discriminating whether the present track position is an end point of a corresponding track and, if it is discriminated that the present track position in not the end point of the corresponding track, then discriminating whether the present mode is the slow forward playback mode under the condition that the normal playback mode is performed;
   (b-3) reading M and N, where M>N and M–N equals an even number, if it is discriminated at sub-step (b-2) that the present track position is the end point of the corresponding track, setting i to "0" and then discriminating whether N is greater than i;
   (b-4) performing the normal playback mode if it is discriminated at sub-step (b-3) that N is greater than i, incrementing i and then discriminating whether N is greater than i;
   (b-5) discriminating whether M is greater than i if it is discriminated at sub-step (b-3) than N is smaller than i;
   (b-6) performing the still playback mode if it is discriminated at sub-step (b-5) that M is greater than i, incrementing i and then discriminating whether M is greater than i;
   (b-7) discriminating whether the slow forward playback mode is to be stopped, if it is discriminated at sub-step (b-5) that M is smaller than i; and
   (b-8) setting i to "0" and returning to sub-step (b-3) if it is discriminated at sub-step (b-7) that the slow forward playback mode is not to be stopped, and stopping the slow forward playback mode if it is discriminated at sub-step (b-7) that the slow forward playback mode is to be stopped.

3. A method of reproducing a video signal in a digital video cassette recorder, comprising the steps of:

(a) performing intra-frame coding at an interval of a predetermined number of frames of the video signal to compress the video signal, and recording the compressed video signal on a video tape;

(b) varying a travelling speed of the video tape according to a desired one of normal, still, fast forward jump, fast reverse jump, slow forward and slow reverse playback modes to reproduce the video signal recorded on the video tape in the desired playback mode;

wherein step (b) includes the sub-steps of:

(b-1) discriminating whether the present mode is the slow reverse playback mode, and if it is discriminated that the present mode is not the slow reverse playback mode, discriminating whether the present mode is the slow reverse playback mode under the condition that normal playback is performed;

(b-2) if it is discriminated at said sub-step (b-1) that the present mode is the slow reverse playback mode, discriminating whether the present track position is an end point of a corresponding track and, if it is discriminated that the present track position in not the end point of the corresponding track, then discriminating whether the present mode is the slow reverse playback mode under the condition that the normal playback mode is performed;

(b-3) reading M and N, where M>N, if it is discriminated at sub-step (b-2) that the present track position is the end point of the corresponding track, setting i to "0" and then discriminating whether N is greater than i;

(b-4) performing the normal playback mode if it is discriminated at sub-step (b-3) that N is greater than i, incrementing i and then discriminating whether N is greater than i;

(b-5) discriminating whether M is greater than i if it is discriminated at sub-step (b-3) that N is smaller than i;

(b-6) performing the still playback mode if it is discriminated at sub-step (b-5) that M is greater than i, incrementing i and then discriminating whether M is greater than i;

(b-7) moving video tape reversely in a jumping manner if it is discriminated at sub-step (b-5) that M is smaller than i and discriminating whether the slow reverse playback mode is to be stopped; and (b-8) setting i to "0" and returning to sub-step (b-3), if it is discriminated at sub-step (b-7) that the slow reverse playback mode is not to be stopped, and stopping the slow reverse playback mode if it is not discriminated at sub-step (b-7) that the slow reverse playback mode is to be stopped.

4. The method of reproducing a video signal in a digital video cassette recorder, as set forth in claim 3, wherein sub-step (b-7) includes displaying the reproduced video signal on a screen in the normal mode upon moving the video tape reversely in the jumping manner.

5. The method of reproducing a video signal in a digital video cassette recorder, as set forth in claim 4, further comprising the steps of:

outputting a signal regarding the slow reverse playback mode of a desired multi-speed from the digital video to a receiver for the screen;

storing the signal regarding the slow reverse playback mode in the receiver for the screen;

performing a playback operation by the receiver according to the signal regarding the slow reverse playback mode, the reproduced video signal being displayed on the screen in response to the performing; and operating the receiver and the digital video cassette recorder systematically to coordinate the display of the reproduced video signal on the screen of the receiver.

6. A method of reproducing a video signal in a digital video cassette recorder, comprising the steps of:

(a) performing intra-frame coding at an interval of a predetermined number of frames of the video signal to compress the video signal, and recording the compressed video signal on a video tape;

(b) varying a travelling speed of the video tape according to a desired one of normal, still, fast forward jump, fast reverse jump, slow forward and slow reverse playback modes to reproduce the video signal recorded on the video tape in the desired playback mode;

wherein step (b) includes the sub-steps of:

(b-1) discriminating whether the present mode is the fast forward jump playback mode, and if it is discriminated that the present mode is not the fast forward jump playback mode; discriminating whether the present mode is the fast forward jump playback mode under the condition that normal playback is performed;

(b-2) if it is discriminated at said sub-step (b-1) that the present mode is the fast forward jump playback mode; discriminating whether the present track position is an end point of a corresponding track and, if it is discriminated that the present track position in not the end point of the corresponding track, then discriminating whether the present mode is the fast forward jump playback mode under the condition that the normal playback mode is performed;

(b-3) reading N if it is discriminated at step sub- (b-2) that the present track position is the end point of the corresponding track, setting i to "0" and then discriminating whether N is greater than i;

(b-4) performing the normal playback mode if it is discriminated at said step (b-3) that N is greater than i, incrementing i and then discriminating whether N is greater than i;

(b-5) moving the video tape fast forward if it is discriminated at step (b-3) that N is smaller than i; and (b-6) discriminating whether the fast forward playback mode is to be stopped, setting i to "0" and returning to step (b-3), if it is discriminated that the fast forward playback mode is not to be stopped, and stopping the fast forward playback mode if it is discriminated that the fast forward playback mode is to be stopped.

7. A method of reproducing a video signal in a digital video cassette recorder, comprising the steps of:

(a) performing intra-frame coding at an interval of a predetermined number of frames of the video signal to compress the video signal, and recording the compressed video signal on a video tape;

(b) varying a travelling speed of the video tape according to a desired one of normal, still, fast forward jump, fast reverse jump, slow forward and slow reverse playback modes to reproduce the video signal recorded on the video tape in the desired playback mode;

wherein step (b) includes the sub-steps of:

(b-1) discriminating whether the present mode is the fast reverse jump playback mode, and if it is discriminated that the present mode is not the fast reverse jump playback mode, discriminating whether the present mode is the fast reverse jump playback mode under the condition that normal playback is performed;

(b-2) if it is discriminated at sub-step (b-1) that the present mode is the fast reverse jump playback mode, discriminating whether the present track position is an end point of a corresponding track and, if it is discriminated that the present track position is not the end point of the corresponding track, then discriminating whether the present mode is the fast reverse jump playback mode under the condition that the normal playback mode is performed;

(b-3) reading N if it is discriminated at said step (b-2) that the present track position is the end point of the corresponding track, setting i to "0" and then discriminating whether N is greater than i;

(b-4) performing the normal playback mode if it is discriminated at said step (b-3) that N is greater than i; incrementing i and then discriminating whether N is greater than i;

(b-5) moving the video tape fast reversely in a jumping manner if it is discriminated at said step (b-3) that N is smaller than i; and (b-6) discriminating whether the fast reverse jump playback mode is to be stopped, setting i to "0" and returning to said step (b-3), if it is discriminated that the fast reverse jump playback mode is not to be stopped, and stopping the fast reverse jump playback mode if it is discriminated that the fast reverse jump playback mode is to be stopped.

8. The method of reproducing a video signal in a digital video cassette recorder, as set forth in claim 7, wherein sub-step (b-5) includes displaying the reproduced video signal on a screen in the normal mode upon moving the video tape reversely in the jumping manner.

9. The method of reproducing a video signal in a digital video cassette recorder, as set forth in claim 8, further comprising the steps of:

outputting a signal regarding the fast reverse jump playback mode of a desired multi-speed from the digital video to a receiver for the screen;

storing the signal regarding the slow reverse playback mode in the receiver for the screen; and performing a playback operation by the receiver according to the signal regarding the fast reverse jump playback mode, the reproduced video signal being displayed on the screen in response to the performing.

10. A method of multi-speed recording-reproducing of a video signal in a digital video cassette recorder, comprising the steps of;

(a) performing intra-frame coding at an interval of a predetermined number of frames of the video signal to compress the video signal, and recording the compressed video signal on a video tape;

(b) discriminating whether the present mode is the still playback mode, under condition that the normal playback mode is performed and, if it is discriminated that the present mode is the still playback mode, then discriminating whether the present track position is an end point of a corresponding track; and (c) disabling all frame memories and stopping a capstan motor, if it is discriminated that the present track position is the end point of the corresponding track in said step (b).

11. A method of multi-speed recording-reproducing of a video signal in digital video cassette recorder, comprising the steps of;

(a) performing intra-frame coding at an interval of a predetermined number of frames of video signal to compress the video signal, and recording the compressed video signal on a video tape;

(b) discriminating whether the present mode is the slow forward playback mode, under the condition that the normal playback mode is performed and, if it is discriminated that the present mode is slow forward playback mode, then discriminating whether the present track position is an end point of a corresponding track; and (c) performing repeatedly the reproduction by normal playback and the stop operation by an even number multiple of one field to be reproduced, if it is discriminated that the present track position is the end point of the corresponding track in said step (b).

12. The method of multi-speed recording-reproducing of a video signal in a digital video cassette recorder, as set forth in claim 11, wherein said step (c) includes the sub-steps of:

(c-1) reading M and N, where M>N and M–N equals an even number, if it is discriminated at said step (b-2) that the present track position is the end point of the corresponding track, setting i to "0" and then discriminating whether N is greater than i;

(c-2) performing the normal playback mode if it is discriminated at said step (c-1) that N is greater than i, incrementing i and then discriminating whether N is greater than i;

(c-3) discriminating whether M is greater than i if it is discriminated at said step (c-1) that N is smaller than i;

(c-4) performing the still playback mode if it is discriminated at said step (c-3) that M is greater than i, incrementing i and then discriminating whether M is greater than i;

(c-5) discriminating whether the slow forward playback mode is to be stopped, if it is discriminated at said step (c-3) that M is smaller than i; and (c-6) setting i to "0" and returning to said step (c-1) if it is discriminated at said step (c-5) that the slow forward playback mode is not to be stopped, and stopping the slow forward playback mode if it is discriminated at said step (c-5) that the slow forward playback mode is to be stopped.

13. A method of multi-speed recording-reproducing of a video signal in a digital video cassette recorder, comprising the steps of;

(a) performing intra-frame coding at an interval of a predetermined number frames of the video signal to compress the video signal, and recording the compressed video signal on a video tape;

(b) discriminating whether the present mode is the slow reverse playback mode, under the condition that the normal playback mode is performed and, if it is discriminated that the present mode is the slow reverse playback mode, then discriminating whether the present track position is an end point of a corresponding track; and (c) scanning an intra-frame coded track by normal playback and storing the scanned data if it is discriminated that the present track position is the end point of the corresponding track in said step (b), and performing sequential output from the stored data in reverse order, and then performing skip field reverse at a high speed.

14. The method of multi-speed recording-reproducing of a video signal in a digital video cassette recorder, as set forth in claim 13, wherein said step (c) includes the sub-steps of:

(c-1) reading M and N, where M>N, if it is discriminated at said step (b-2) that the present track position is the end point of the corresponding track, setting i to "0" and then discriminating whether N is greater than i;

(c-2) performing the normal playback mode if it is discriminated at said step (c-1) that N is greater than i, incrementing i and then discriminating whether N is greater than i;

(c-3) discriminating whether M is greater than i if it is discriminated at said step (c-1) that N is smaller than i;

(c-4) performing the still playback mode if it is discriminated at said step (c-3) that M is greater than i, incrementing i and then discriminating whether M is greater than i;

(c-5) moving the video tape reversely in a jumping a manner if it is discriminated at said step (c-3) that M is smaller than i and discriminating whether the slow reverse playback mode is to be stopped; and (c-6) setting i to "0" and returning to said step (c-1) if it is discriminated at said step (c-5) that the slow reverse playback mode is not to be stopped, and stopping the slow reverse playback mode if it is discriminated at said step (c-5) that the slow reverse playback mode is to be stopped.

15. The method of multi-speed recording-reproducing of a video signal in a digital video cassette recorder, as set forth in claim 14, wherein said step (c-5) includes displaying the reproduced video signal on a screen in the normal mode upon moving the video tape reversely in a jumping manner.

16. The method of multi-speed recording-reproducing of a video signal in a digital video cassette recorder, as set forth in claim 15, further comprising the steps of:

outputting a signal regarding the slow reverse playback mode, of a desired multi-speed, from the digital video to a receiver for the screen;

storing the signal regarding the slow reverse playback mode in the receiver for the screen;

performing a playback operation by the receiver according to the signal regarding the slow reverse playback mode, the reproduced video signal being displayed on the screen in response to the performing;

and operating the receiver and the digital video cassette recorder systematically to coordinate the display of the reproduced video signal on the screen of the receiver.

17. A method of multi-speed recording-reproducing of a video signal in a digital video cassette recorder, comprising the steps of:

(a) performing intra-frame coding at an interval of a predetermined number of frames of the video signal to compress the video signal, and recording the compressed video signal on a video tape;

(b) discriminating whether the present mode is the fast forward playback mode, under the condition that the normal playback mode is performed and, if it is discriminated that the present mode is the fast forward playback mode, then discriminating whether the present track position is an end point of a corresponding track; and (c) reproducing an intra-frame coded track by normal playback if it is discriminated that the present track position is the end point of the corresponding track in said step (b), and then performing fast forward jump to a next intra-frame coded track.

18. The method of multi-speed recording-reproducing of a video signal in a digital video cassette recorder, as set forth in claim 17, wherein said step (c) includes the steps of:

(c-1) reading N if it is discriminated at said step (b) that the present track position is the end point of the corresponding track, setting i to "0" and then discriminating whether N is greater than i;

(c-2) performing the normal playback mode if it is discriminated at said step (c-1) that N is greater than i, incrementing i and then discriminating whether N is greater than i;

(c-3) moving the video tape fast forward if is discriminated at said step (c-1) that N is smaller than i; and (c-4) discriminating whether the fast forward playback mode is to be stopped, setting i to "0" and returning to said step (c-1) if it is discriminated that the fast forward playback mode is not to be stopped, and stopping the fast forward playback mode if it is discriminated that the fast forward playback mode is to be stopped.

19. The method of multi-speed recording-reproduced of a video signal, in a digital video cassette recorder, comprising the steps of;

(a) performing intra-frame coding at an interval of a predetermined number of frames of the video signal to compress the video signal, and recording the compressed video signal on video tape;

(b) discriminating whether the present mode is the fast reverse jump playback mode, under the condition that the normal playback mode is performed and, if it is discriminated that the present mode is fast reverse jump playback mode, then discriminating whether the present track position is an end point of a corresponding track; and (c) reproducing an intra-frame coded track by normal playback if it is discriminated that the present track position is the end point of the corresponding track in said step (b), and then performing fast reverse jump until the previous intra-frame coded track.

20. The method of multi-speed recording-reproducing of a video signal in a digital video cassette recorder, as set forth in claim 19, wherein said step (c) includes the steps of:

(c-1) reading N if it is discriminated at said step (b) that the present track position is the end point of the corresponding track, setting i to "0" and then discriminating whether N is greater than i;

(c-2) performing the normal playback mode if it is discriminated at said step (c-1) that N is greater than i; incrementing i and then discriminating whether N is greater than i;

(c-3) moving the video tape fast reversely in a jumping manner if it is discriminated at said (c-1) that N is smaller than i; and (c-4) discriminating whether the fast reverse jump playback mode is to be stopped, setting i to "0" and returning to said step (c-1), if it is discriminated that the fast reverse jump playback mode is not to be stopped, and stopping the fast reverse jump playback mode if it is discriminated that the fast reverse jump playback mode is to be stopped.

21. The method of multi-speed recording-reproducing of a video signal in a digital video cassette recorder, as set forth in claim 20, wherein said step (c-3) includes the step of: displaying the reproduced video signal on a screen in the normal mode upon moving the video tape reversely in the jumping manner.

22. The method of multi-speed recording-reproducing of a video signal in a digital video cassette recorder, as set forth in claim 21, further comprising the steps of:

outputting a signal regarding the fast reverse jump playback mode, of a desired multi-speed, from the digital video to a receiver for the screen;

storing the signal regarding the slow reverse jump playback mode in the receiver for the screen; and performing a playback operation by the receiver according to the signal regarding the fast reverse jump playback mode, the reproduced video signal being displayed on the screen in response to the performing.

* * * * *